(12) United States Patent
Whalen et al.

(10) Patent No.: US 11,200,049 B2
(45) Date of Patent: Dec. 14, 2021

(54) AUTOMATED TEST AUTHORIZATION MANAGEMENT

(71) Applicant: International Business Machines Corporation, Armonk, NY (US)

(72) Inventors: Yukiko Whalen, Sumida (JP); Tomokazu Nakamura, Tokyo (JP); Mihoko Hasegawa, Shinjuku (JP); Akira Fujiu, Mitaka (JP)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/734,742

(22) Filed: Jan. 6, 2020

(65) Prior Publication Data
US 2021/0208872 A1    Jul. 8, 2021

(51) Int. Cl.
  *G06F 9/44* (2018.01)
  *G06F 8/70* (2018.01)
  *G06Q 10/06* (2012.01)
  *G06F 11/36* (2006.01)
  *G06F 21/12* (2013.01)

(52) U.S. Cl.
  CPC .............. *G06F 8/70* (2013.01); *G06F 11/366* (2013.01); *G06F 11/3688* (2013.01); *G06F 11/3692* (2013.01); *G06F 21/121* (2013.01); *G06Q 10/063112* (2013.01)

(58) Field of Classification Search
  CPC ...... G06F 8/70; G06F 11/366; G06F 11/3688; G06F 11/3692; G06F 21/121; G06Q 10/063112
  USPC ................................................. 717/124–134
  See application file for complete search history.

(56) References Cited

U.S. PATENT DOCUMENTS

| | | | |
|---|---|---|---|
| 7,810,067 B2 * | 10/2010 | Kaelicke ................ | G06Q 10/10 717/102 |
| 8,195,983 B2 * | 6/2012 | Celeskey .............. | G06F 11/008 714/38.1 |
| 8,230,267 B2 | 7/2012 | Noller et al. | |
| 9,176,729 B2 * | 11/2015 | Mockus .............. | G06F 11/3616 |
| 10,067,855 B2 | 9/2018 | Kogan-Katz et al. | |
| 10,083,027 B2 * | 9/2018 | Moorthi .................... | G06F 8/71 |

(Continued)

OTHER PUBLICATIONS

Anvik et al., Who Should Fix This Bug?, 2006, ACM, pp. 361-370. (Year: 2006).*

(Continued)

*Primary Examiner* — Ted T. Vo
(74) *Attorney, Agent, or Firm* — Timothy J. Singleton

(57) ABSTRACT

A method, system, and computer program product for automated test authorization management is provided. The method obtains a test result, as part of an issue record, for a test of a software product. The test result contains a set of test attributes and represents an issue affecting the software product. An authorized developer is identified to assign the issue record. The method updates an authorization attribute of the test based on the test result and the authorized developer and transfers the authorization attribute to the authorized developer. The method detects a status transition of the issue record from a first status to a second status and reverts the authorization attribute of the test based on detecting the second status.

18 Claims, 6 Drawing Sheets

(56) References Cited

U.S. PATENT DOCUMENTS 10,089,213 B1   10/2018   Noble et al.
10,162,740 B1   12/2018   Setty et al.

OTHER PUBLICATIONS

Naguib et al., "Bug report assignee recommendation using activity profiles", 2013, IEEE, pp. 22-30. (Year: 2013).*

D.Kiranmayi et al., "Code Quality Measurement and Automatic Bug Triage Using Data Reduction Techniques", International Journal of Applied Engineering Research ISSN 0973-4562 vol. 13, No. 11 (2018), © Research India Publications. http://www.ripublication.com, 3 pages.

Servant et al., "WHOSEFAULT: Automatic Developer-to-Fault Assignment through Fault Localization", ICSE '12, Proceedings of the 34th International Conference on Software Engineering, Jun. 2-9, 2012, ISBN: 978-1-4673-1067-3, 11 pages.

* cited by examiner

AUTOMATED TEST AUTHORIZATION MANAGEMENT

BACKGROUND

Quality assurance operations are used in various stages of the software development life cycle. Often, when a bug is identified within a software product, the bug is identified by an automated tool. A team in charge of quality assurance may open a task or set of tasks relating to the bug. A different team may then address the bug, attempting to find a fix or work around.

SUMMARY

According to an embodiment described herein, a computer-implemented method for automated test authorization management, is provided. The computer-implemented method obtains a test result, as part of an issue record, for a test of a software product. The test result contains a set of test attributes and represents an issue affecting the software product. An authorized developer is identified to assign the issue record. The computer-implemented method updates an authorization attribute of the test based on the test result and the authorized developer and transfers the authorization attribute to the authorized developer. The computer-implemented method detects a status transition of the issue record from a first status to a second status and reverts the authorization attribute of the test based on detecting the second status.

According to an embodiment described herein, a system for automated test authorization management is provided. The system includes one or more processors and a computer-readable storage medium, coupled to the one or more processors, storing program instructions that, when executed by the one or more processors, cause the one or more processors to perform operations. The operations obtain a test result, as part of an issue record, for a test of a software product. The test result contains a set of test attributes and represents an issue affecting the software product. An authorized developer is identified to assign the issue record. The operations update an authorization attribute of the test based on the test result and the authorized developer and transfers the authorization attribute to the authorized developer. The operations detect a status transition of the issue record from a first status to a second status and reverts the authorization attribute of the test based on detecting the second status.

According to an embodiment described herein a computer program product for automated test authorization management is provided. The computer program product includes a computer readable storage medium having program instructions embodied therewith, the program instructions being executable by one or more processors to cause the one or more processors to obtain a test result, as part of an issue record, for a test of a software product. The test result contains a set of test attributes and represents an issue affecting the software product. An authorized developer is identified to assign the issue record. The computer program product updates an authorization attribute of the test based on the test result and the authorized developer and transfers the authorization attribute to the authorized developer. The computer program product detects a status transition of the issue record from a first status to a second status and reverts the authorization attribute of the test based on detecting the second status.

DETAILED DESCRIPTION

Figure 1:
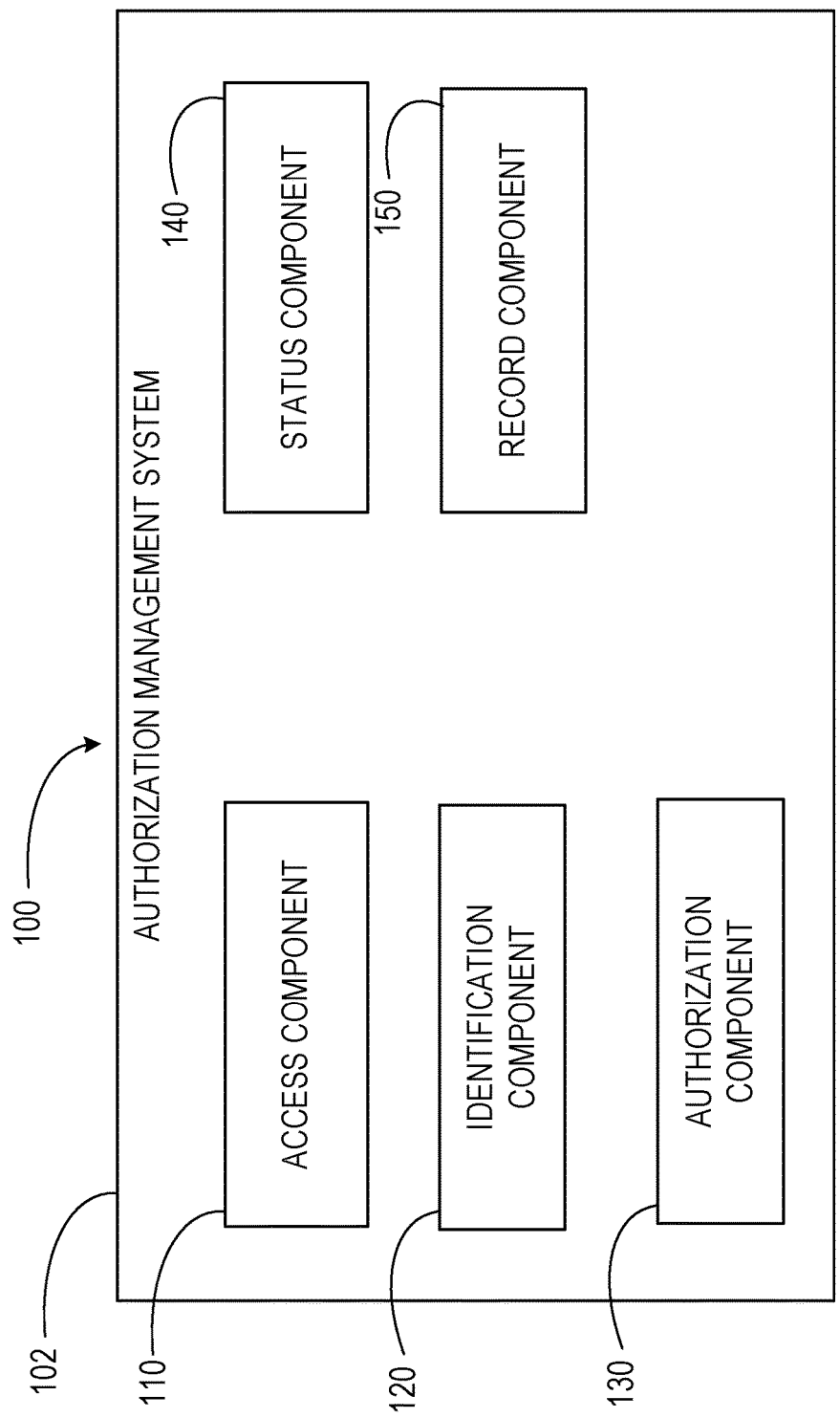
FIG. 1 depicts a block diagram of a computing environment for implementing concepts and computer-based methods, according to at least one embodiment.

The present disclosure relates generally to methods for privacy protection for automated test authorization management. More particularly, but not exclusively, embodiments of the present disclosure relate to a computer-implemented method for quality testing management and automatic authorization reassignment for post-failure testing. The present disclosure relates further to a related system for automated test authorization management, and a computer program product for operating such a system.

Quality assurance operations and testing are used in various stages of the software development life cycle. When a bug is identified within a software product, the bug can be identified by an automated tool. Automated tools for bug identification and task management tools often occur as differing systems. Where differing tools operate as a part of differing systems, some quality assurance operations Data security systems often attempt to sanitize public facing data deemed to be identifying. Some current systems incorporate cross-system or cross-team requests to handle re-execution of tests after an initial test has identified a bug.

Teams responsible for quality assurance and development can be separated. As such, the teams may use manual authorization transfers to manage testing and other control permissions between these teams as they test for and address bugs within a software product. For example, automated testing tools and task management tools may be implemented in two different systems. In such implementations, an authorization to run a test on the automated testing tools may be owned by one team or system. Thus, authorization for testing may be transferred or precluded depending on an identified bug or depending on a stage in the software development life cycle. For example, a request from a development team to a quality assurance team may be used to authorize a test after a fix has been applied to an identified bug. Subsequently, a validation process for the fix may be carried out manually. In some situations, granting full authorization for testing to an automated testing tool may lead to breakdowns in a testing or software development environment.

Quality assurance teams may describe information that is useful for reproducing problems found by automated testing tools (and open issues after a problem is identified). Such information may be delayed, due to manual processes, from being received by a development team tasked with addressing identified problems. In some current systems, development teams confirm content of identified problems to manage task assignments to individuals within the development team. However, relying on information sourced from the quality assurance teams may introduce errors, delays, and/or other inefficiencies. As such, after completing tasks to address identified problems, a quality assurance team may be tasked with running one or more manual tests. Alternatively, the quality assurance team can be tasked with configuring automated testing tools to perform localized tests. The localized tests may include tests for the repair tasks or previously identified problems. However, such manual calibration, assignment, and testing may introduce inefficiencies, delays, and mistakes into quality assurance testing.

Given the inefficiencies and errors encountered in the management and operation of automated testing procedures, embodiments of the present disclosure enable automated granting and revocation of testing authorizations. Some embodiments of the present disclosure grant an authorization to run a test and provide assistance for quality assurance operations. In this way, some embodiments may efficiently perform a series of tasks based on statuses or triggers indicating testing failures, identification of problems, and designated resolutions to identified problems. Further, some embodiments of the present disclosure enable automated generation of issue records within task management tools when an automated testing tool identifies a problem within a software product. Also, some embodiments of the present disclosure enable temporary assignment or reassignment of testing authorizations in association with issue records when a status transition of the issue is detected. Additionally, some embodiments of the present disclosure enable authorization assignment of a designated issue to be revoked after the validation of a fix has been completed by an automated testing tool.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise system components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an authorization management system 102. The authorization management system 102 may comprise an access component 110, an identification component 120, an authorization component 130, a status component 140, and a record component 150. The access component 110 obtains test results for tests of software products. The identification component 120 identifies an authorized developer to assign an issue record associated with a test of software products. The authorization component 130 modifies an authorization attribute of the test based on the test result and the authorized developer. The status component 140 detects a status transition of the issue record. The record component 150 extracts a subset of test attributes from the test result and generates issue records. Although described with distinct components, it should be understood that, in at least some embodiments, components may be combined or divided, or additional components may be added, without departing from the scope of the present disclosure.

Figure 2:
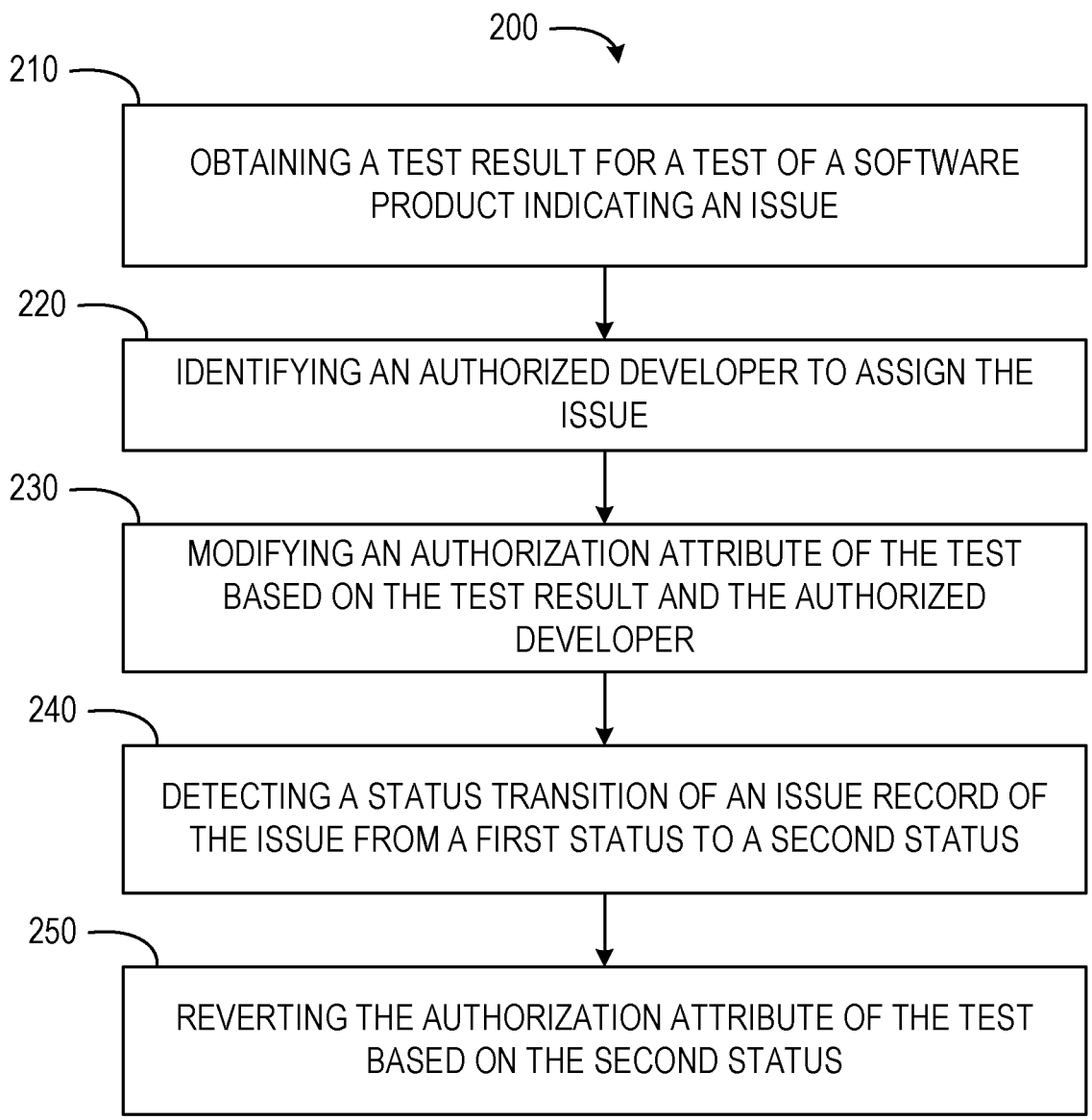
FIG. 2 depicts a flow diagram of a computer-implemented method for automated test authorization management, according to at least one embodiment.

Referring now to FIG. 2, a flow diagram of a computer-implemented method 200 is shown. The computer-implemented method 200 is a method for automated test authorization management. In some embodiments, the computer-implemented method 200 may be performed by one or more components of the computing environment 100, as described in more detail below.

At operation 210, the access component 110 obtains a test result for a test of a software product indicating an issue. In some embodiments, the test is executed by an automated testing system. The automated testing system may be a user interface (UI) automation system, a task management tool, a quality assurance tool, combinations thereof, or any other suitable and relevant systems or tools capable of running tests on components, functions, or aspects of a software product. Once obtained, the record component 150 may parse the contents of the test result and pass information extracted during the parsing process to one or more components of the authorization management system.

In some embodiments, the test result contains a set of test attributes. The test result may represent an issue affecting the software product. The issue may be represented by an issue record. The issue record may contain a status. Once the issue record is established, the test result may be appended to the issue or issue record. The test result may be appended to the issue record as a comment. In some instances, the issue record contains a first status and at least a portion of the set of test attributes associated with the test result. For example, in some embodiments, the access component 110 obtains the test result as a JSON file that includes a result of a UI Automation test executed by a continuous integration (CI) tool. Although the test result is described as being obtained in a specified file format, it should be understood that the test result may be obtained as any suitable or relevant file format. For example, in some instances, the test result may be obtained as an XML file.

The test result may include tag information indicating a critical nature of the test. The tag information may be associated with or part of the authorization attribute. If a critical tag is included with a test result, failure of the test may indicate that approval to activate a subsequent test is to be authorized prior to a subsequent test being run. In such instances, the critical tag may be appended or added to the issue record. The critical tag may indicate approval for a subsequent test is to be given by an owner of the issue record. Once the issue record is assigned, the owner, such as an authorized developer, may authorize a subsequent test, perform a subsequent test, or dismiss the critical tag. In some instances, dismissal of the critical tag reverts authorization for subsequent tests to a party, system, or tool which performed the test resulting in the issue and issue record.

At operation 220, the identification component 120 identifies an authorized developer to assign the issue record. In some embodiments, the identification component 120 identifies a person in charge of development of the software product, or a portion thereof, to whom the issue is to be assigned. In some embodiments, the identification component 120 identifies the authorized developer based on associated authorization permissions for the developer. The identification component 120 may identify the authorized developer based on known expertise of a set of developers. In some instances, the identification component 120 identifies the authorized developer based on a role of the developer. The role may be associated with a portion of the software product at which the error or failed test occurred and resulting in the issue referenced in operation 210. The identification component 120 may identify the authorized developer using a mapping of developers to issues, software products, functions, or any other suitable organization mapping. In some instances, the authorized developer is found based on an obtained summary name of the issue or error in the software product. Once identified, the authorized developer may be assigned to the issue or issue record.

At operation 230, the authorization component 130 modifies an authorization attribute of the test based on the test result and the authorized developer. The modification may be understood as an update to the authorization attribute of the test. In some embodiments, the authorization component 130 modifies the authorization attribute by generating an execution authorization for the test corresponding to the issue. Where the test is executed by an automated testing system, the authorization component 130 modifies the authorization attribute by transferring the execution authorization from the automated testing system to the authorized developer. In some embodiments, the authorized attribute is transferred to the authorized developer.

The authorization component 130 associates the execution authorization with the issue record. In some embodiments, the authorization component 130 associates the execution authorization to run additional tests with the issue record assigned to the authorized developer. The authorization component 130 may generate the execution authorization as an authorization to run a previously failed test. The execution authorization may be for a test corresponding to a content of the issue associated with the issue record. In some instances, the test being authorized is a same test as the previously failed test. In some instances, the authorization component 130 identifies an error type for the issue associated with the issue record and determines a test or a test type for the issue. The test or test type may be a test configured to determine whether the issue has been resolved after actions taken by the authorized developer. In some instances, the test or test type determined by the authorization component 130 may differ from the previously failed test type. Once the execution authorization is generated for a suitable test, the authorization component 130 associates the execution authorization with the issue. The authorization component 130 may associate the execution authorization by inserting an indication of the execution authorization within the issue record.

Modification of the authorization attribute may prevent the automated testing system from running a subsequent instance of the test until the authorization is released. In some embodiments, modification of the authorization attribute temporarily deactivates or re-activates the authorization for execution of the test by the automated testing system. The authorization attribute may be an authorization to run the test associated with the issue and may be suspended on the automated testing system depending on a state of maintenance of a test environment or the software product. Further the authorization attribute may be an authorization to perform a manual test by the authorized developer. When the state allowing execution of the test by the automated testing system is restored, the authorization is activated on the automated testing system.

In some embodiments, modification of the authorization attribute is associated with expansion or contraction of the execution authorization. Where the issue representing the error is a first issue and issue record, the first issue may be associated with a second issue. In some instances, the second issue is a duplicate issue or issue record. The authorization attribute may be associated with the first issue and be expanded to cover a test case associated with the second issue. When a relationship between the first issue and the second issue is terminated, the authorization attribute or the execution authorization to run the test of the first issue may be restored to an original state, contracting the authorization and removing authorization to test the second issue.

At operation 240, the status component 140 detects a status transition of the issue record. The status transition may be a change or transition from a first status to a second status. In some embodiments, the first status is a status indicating the issue. The first status may represent an error within the software product, the failed test, the test result, or the issue record. In some embodiments, the second status is a status indicating the issue has been addressed. The second status may indicate that the authorized developer has solved or otherwise addressed the issue. The second status may be determined or generated upon completion of a subsequent test and the subsequent test returning a positive test result. The status transition may be automatic, in response to receiving a positive test result. The status transition may be manual, performed by the authorized developer when an issue has been addressed or a positive test result has been achieved.

In some embodiments, the test result is a first test result run by the automated testing system. The first test result may contain a set of first test attributes. In such instances, the status component 140 detects a second test result for the software product. The second test result may contain a set of second test attributes. The set of second test attributes may differ from the set of first test attributes. Once detected, the record component 150 appends the second test result to the issue record.

At operation 250, the authorization component 130 reverts the authorization attribute of the test based on the second status. In some embodiments, the authorization attribute is reverted based on detecting the second status for the issue record. When the status component 140 detects a fix has been created for the issue and the status of the issue has changed (e.g., the issue status has been identified as fixed), the status component 140 may transmit an authorization transfer request to the authorization component 130. In some embodiments, the authorization component 130 reverts the authorization attribute to the automated testing system which performed the initial test identifying the issue. In such embodiments, once the authorization attribute reverts to the automated testing system, the automated testing system executes a subsequent test to ensure the issue is resolved.

In some embodiments, once the subsequent test confirms the issue is resolved or fixed, the status component 140 closes the issue. In some instances, the authorized developer or a team of developers manually closes the issue in response to the subsequent test indicating the issue is resolved. Once the status component 140 detects the issue is resolved, the assignment of the issue record to the authorized developer may be revoked. In some embodiments, the status component 140 revokes the authorization attribute for the authorized developer when the issue is detected as being resolved.

Figure 3:
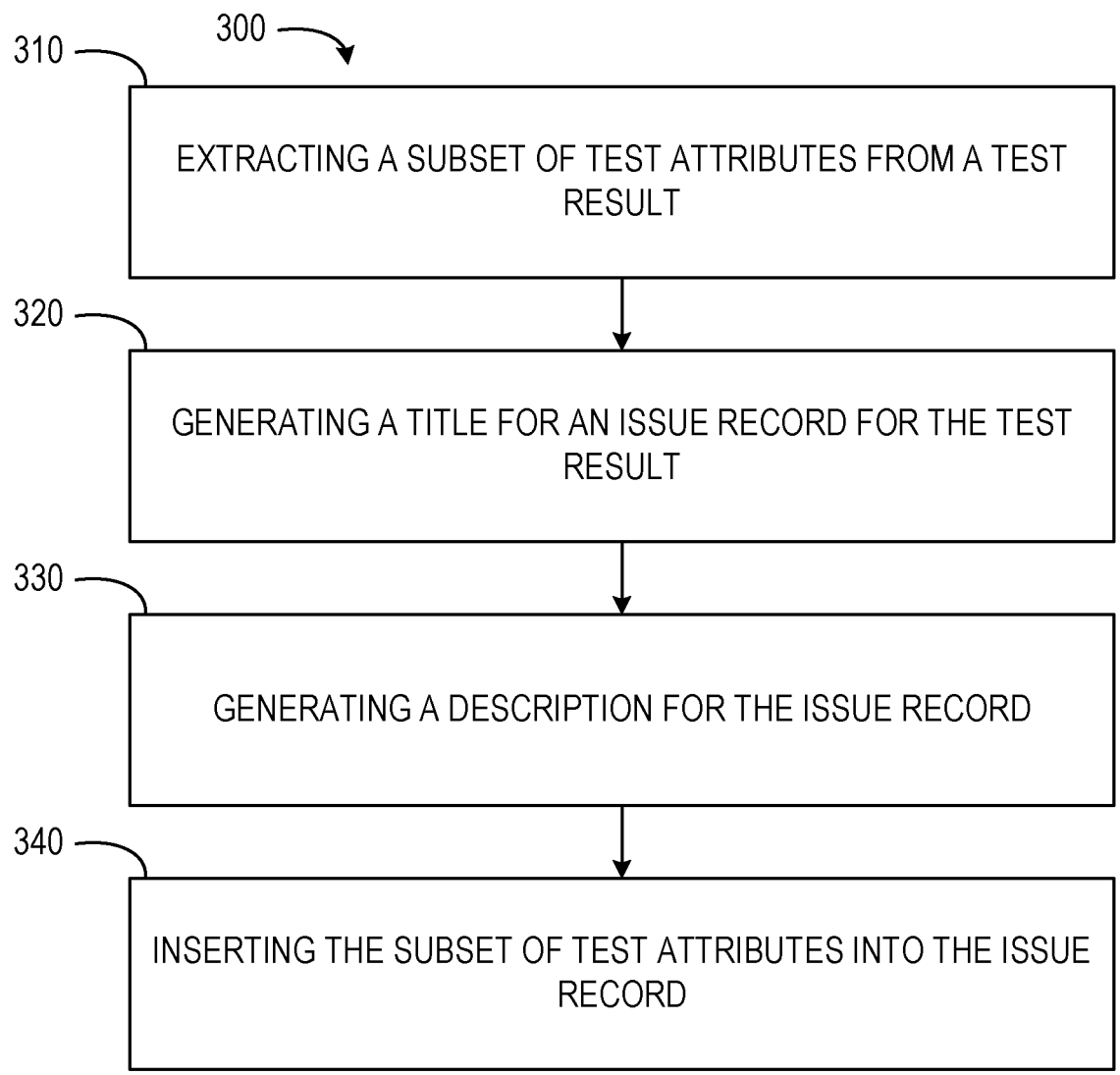
FIG. 3 depicts a flow diagram of a computer-implemented method for automated test authorization management, according to at least one embodiment.

FIG. 3 shows a flow diagram of an embodiment of a computer-implemented method 300 for automated test authorization management. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the record component 150 extracts a subset of test attributes from the test result. The record component 150 may extract pieces of information from a test file and the JSON file obtained in operation 210. In some embodiments, the record component 150 extracts the pieces of information by parsing a JSON file obtained in operation 210. The record component 150 may extract an owner of a testing scenario and a tag name from the test file. The record component 150 may extract items having a status of a test case. The status of the test case may indicate a "Fail" or "Broken" status. The status of the test case may be included in the JSON file.

In some embodiments, the record component 150 extracts information regarding representing a step of the software program causing an error. The extracted information may include a scenario name. The scenario name may be a summary name of the portion that the UI Automation system executed. The extracted information may include a timestamp of the test. In some instances, the extracted information includes an error message. The extracted information may also include a procedure of the steps from a top or beginning of a file to a location of the failure resulting in the failed status of the test results.

For example, the record component 150 may extract an object having a test step status indicated as "broken" or "failed" from a test result file of .json format. The name may be extracted as a summary of the portion run by the automated testing system. For example, a name may be extracted as "name": "[MachineLearningModeler] check detailed chart for a binary classification deployment." A status may be extracted as "status": "broken". Status details may be extracted to indicate an error message or issue, such as "statusDetails": {"message": "selenium.common.exceptions.TimeoutException: Message: ¥n¥n"}. In some instances, the extracted information includes names of all steps included up to the error inducing step. For example, the extracted information may include names of the failed/broken step and all preceding steps. The extracted data may be stored as metadata in the issue record.

In operation 320, the record component 150 generates a title for the issue record for the test result. The title may be generated from the information parsed from the JSON file. The title represents an error location of the issue within the software product. In some embodiments, the title of an issue is generated in response to obtaining the test result in operation 210. A new issue record may be created on a task management tool in response to identifying the issue. The title of the issue record may be generated from information extracted in operation 310. In some embodiments, the title of the issue record includes a name of a step at which an error occurred. The title of the issue record may include an error message or a representation of an error message resulting from the error.

In operation 330, the record component 150 generates a description for the issue record. The record component 150 may generate the description of the issue record from the information extracted in operation 310. In some embodiments, the description for the issue record includes a run time. The description may also include a step procedure of the software product until occurrence of the error resulting in the failed status of the test. The description for the issue record may include a comment representing the test result representing the error and the failed status of the test.

In operation 340, the record component 150 inserts the subset of test attributes into the issue record. In some embodiments, once the issue record is created, the title and description may be applied to the issue record. The record component 150 may also insert at least a portion of the test attributes (e.g., a subset of test attributes of the set of test attributes) into the issue record. In some embodiments, the record component 150 inserts at least a portion of the information extracted in operation 310 into the issue record.

Figure 4:
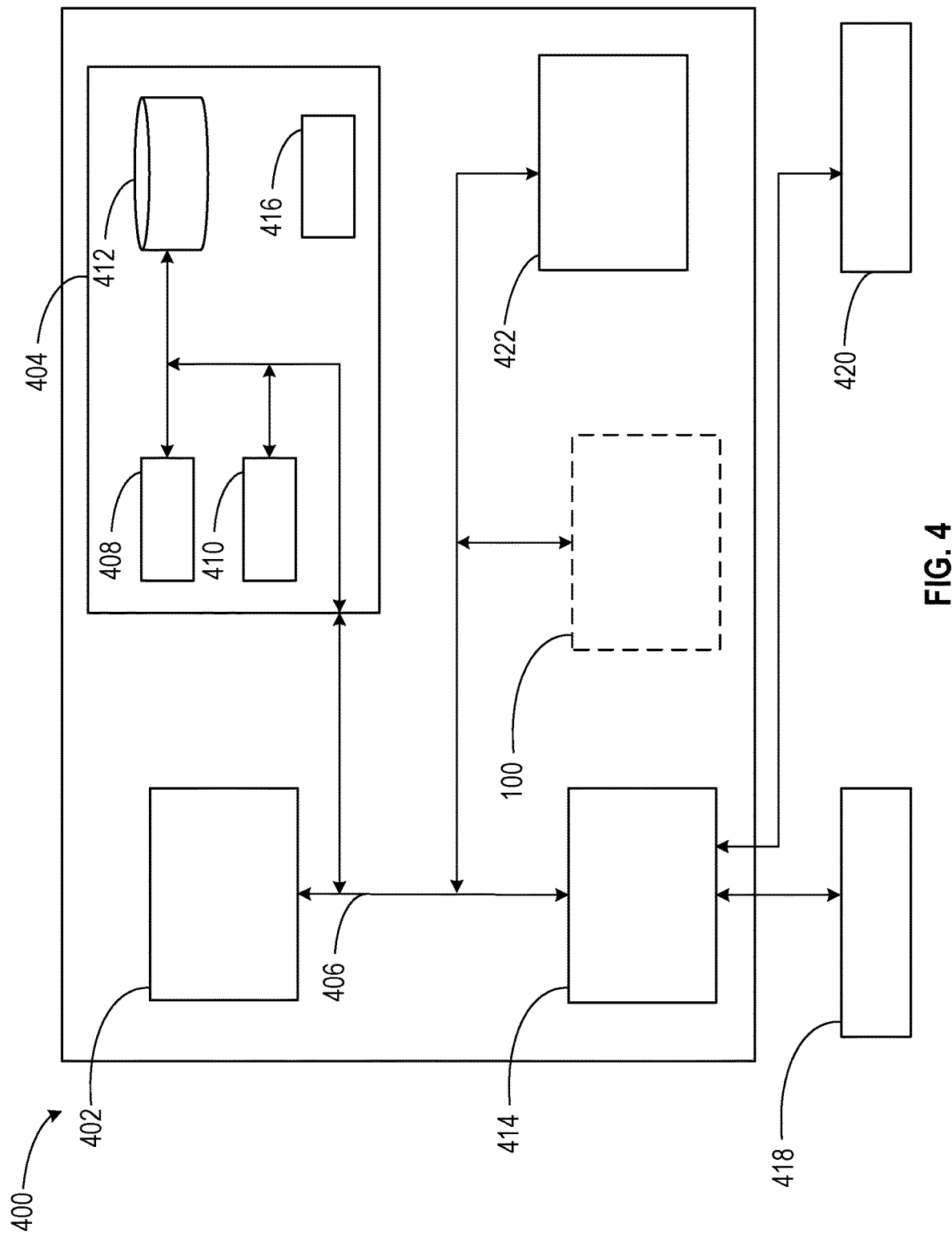
FIG. 4 depicts a block diagram of a computing system for automated test authorization management, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for automated test authorization management.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the access component 110, the identification component 120, the authorization component 130, the status component 140, and the record component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
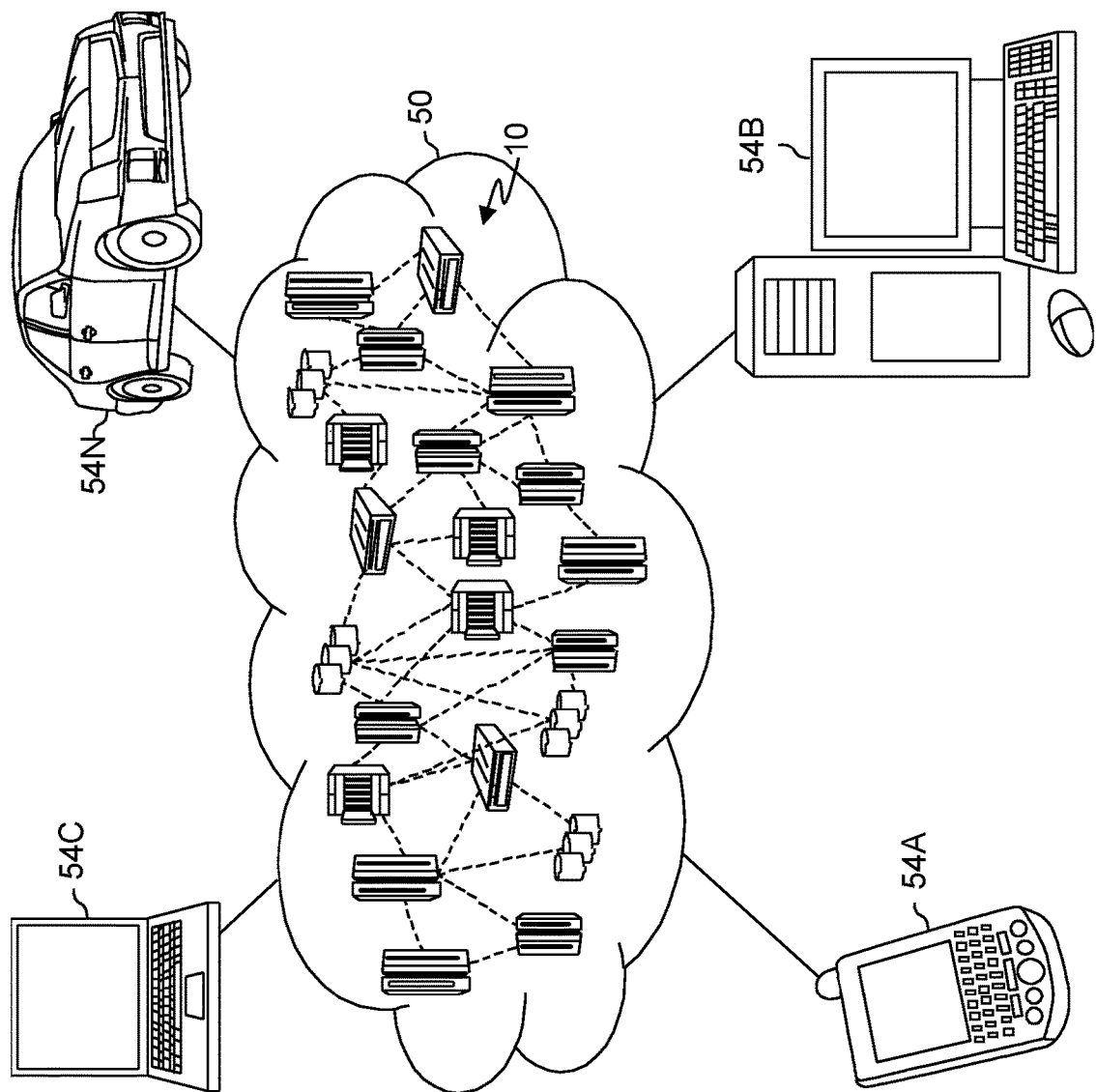
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
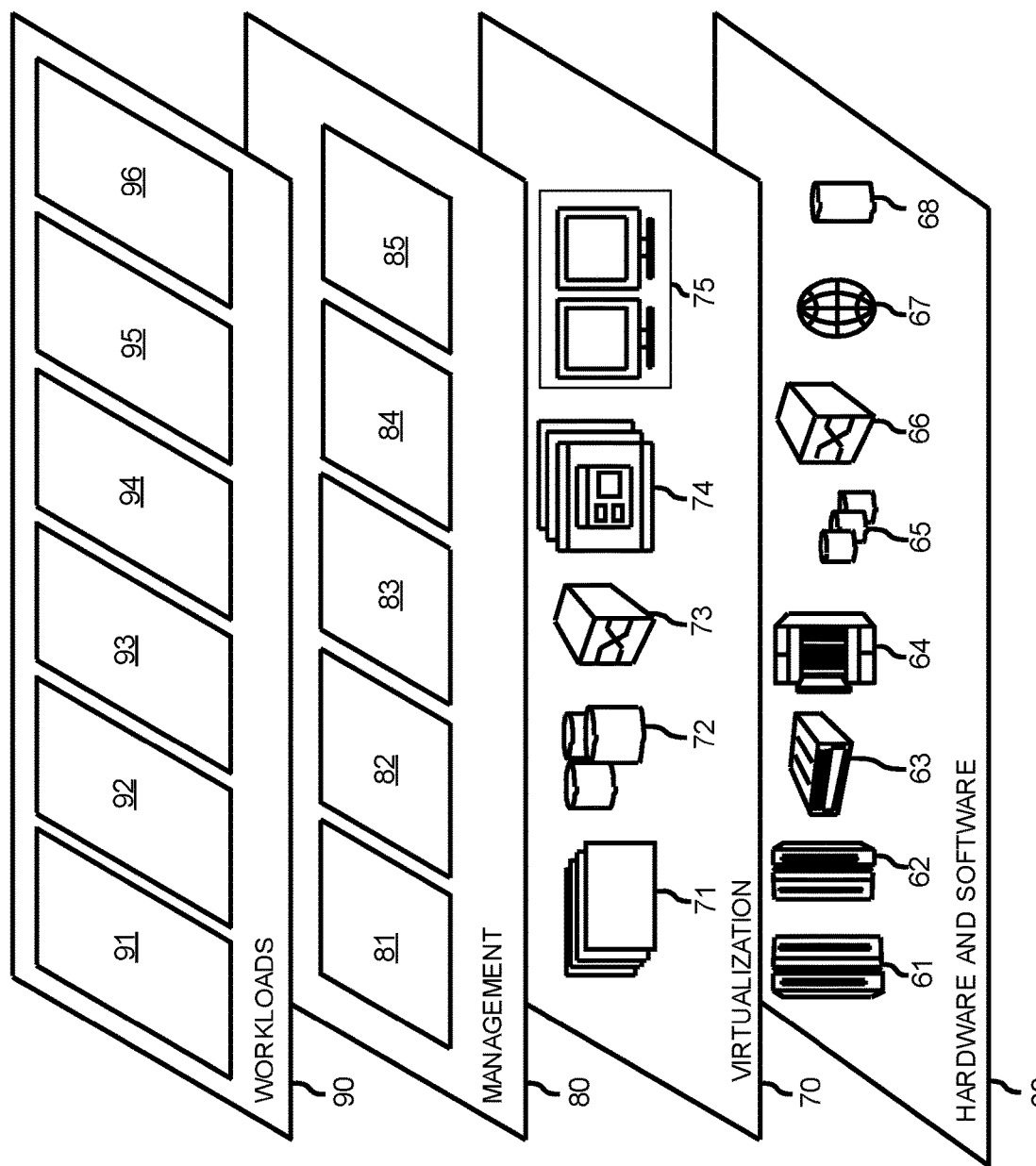
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated test authorization management processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining a test result, executed by an automated testing system, for a test of a software product, the test result containing a set of test attributes and representing an issue affecting a portion of the software product, the issue represented by an issue record having a first status;
    identifying an authorized developer to assign the issue record based on the portion of the software product associated with the issue;
    updating an authorization attribute of the test based on the test result and the authorized developer, the authorization attribute being transferred from the automated testing system to the authorized developer;
    detecting a status transition of the issue record from the first status to a second status; and
    reverting the authorization attribute of the test based on detecting the second status, the authorization attribute reverting from the authorized developer to the automated testing system.

2. The computer-implemented method of claim 1, wherein obtaining the test result further comprises:
    generating a title for the issue record, the title representing an error location of the issue within the software product; and
    generating a description for the issue record.

3. The computer-implemented method of claim 2, wherein the method further comprises:
    extracting a subset of test attributes from the test result; and
    inserting the subset of test attributes into the issue record.

4. The computer-implemented method of claim 1, wherein updating the authorization attribute of the test further comprises:
    generating an execution authorization for the test corresponding to the issue; and
    associating the execution authorization with the issue record.

5. The computer-implemented method of claim 1, wherein the test result is a first test result containing a set of first test attributes, and wherein detecting the status transition further comprises:
    detecting a second test result for the software product, the second test result having a set of second test attributes differing from the set of first test attributes of the first test result.

6. The computer-implemented method of claim 5, wherein detecting the status transition further comprises:
    appending the second test result to the issue record.

7. A system, comprising:
    one or more processors; and
    a computer-readable storage medium, coupled to the one or more processors, storing program instructions that, when executed by the one or more processors, cause the one or more processors to perform operations comprising:
        obtaining a test result, executed by an automated testing system, for a test of a software product, the test result containing a set of test attributes and representing an issue affecting a portion of the software product, the issue represented by an issue record having a first status;
        identifying an authorized developer to assign the issue record based on the portion of the software product associated with the issue;
        updating an authorization attribute of the test based on the test result and the authorized developer, the authorization attribute being transferred from the automated testing system to the authorized developer;
        detecting a status transition of the issue record from the first status to a second status; and
        reverting the authorization attribute of the test based on detecting the second status, the authorization attribute reverting from the authorized developer to the automated testing system.

8. The system of claim 7, wherein obtaining the test result further comprises:
    generating a title for the issue record, the title representing an error location of the issue within the software product; and
    generating a description for the issue record.

9. The system of claim 8, wherein the operations further comprise:
    extracting a subset of test attributes from the test result; and
    inserting the subset of test attributes into the issue record.

10. The system of claim 7, wherein updating the authorization attribute of the test further comprises:
    generating an execution authorization for the test corresponding to the issue; and
    associating the execution authorization with the issue record.

11. The system of claim 7, wherein the test result is a first test result containing a set of first test attributes, and wherein detecting the status transition further comprises:
    detecting a second test result for the software product, the second test result having a set of second test attributes differing from the set of first test attributes of the first test result.

12. The system of claim 11, wherein detecting the status transition further comprises:
    appending the second test result to the issue record.

13. A computer program product comprising a computer readable storage medium having program instructions embodied therewith, the program instructions being executable by one or more processors to cause the one or more processors to perform operations comprising:

obtaining a test result, executed by an automated testing system, for a test of a software product, the test result containing a set of test attributes and representing an issue affecting a portion of the software product, the issue represented by an issue record having a first status;

identifying an authorized developer to assign the issue record based on the portion of the software product associated with the issue;

updating an authorization attribute of the test based on the test result and the authorized developer, the authorization attribute being transferred from the automated testing system to the authorized developer;

detecting a status transition of the issue record from the first status to a second status; and reverting the authorization attribute of the test based on detecting the second status, the authorization attribute reverting from the authorized developer to the automated testing system.

14. The computer program product of claim 13, wherein obtaining the test result further comprises:

generating a title for the issue record, the title representing an error location of the issue within the software product; and generating a description for the issue record.

15. The computer program product of claim 14, wherein the operations further comprise:

extracting a subset of test attributes from the test result; and inserting the subset of test attributes into the issue record.

16. The computer program product of claim 13, wherein the test is executed by an automated testing system, and wherein updating the authorization attribute of the test further comprises:

generating an execution authorization for the test corresponding to the issue;

transferring the execution authorization from the automated testing system to the authorized developer; and associating the execution authorization with the issue record.

17. The computer program product of claim 13, wherein the test result is a first test result containing a set of first test attributes, and wherein detecting the status transition further comprises:

detecting a second test result for the software product, the second test result having a set of second test attributes differing from the set of first test attributes of the first test result.

18. The computer program product of claim 17, wherein detecting the status transition further comprises:

appending the second test result to the issue record.

\* \* \* \* \*